No. 741,979. PATENTED OCT. 20, 1903.
A. ROWAN.
MACHINE FOR GRUBBING SAGE BRUSH.
APPLICATION FILED MAY 8, 1903.
NO MODEL. 2 SHEETS—SHEET 2.
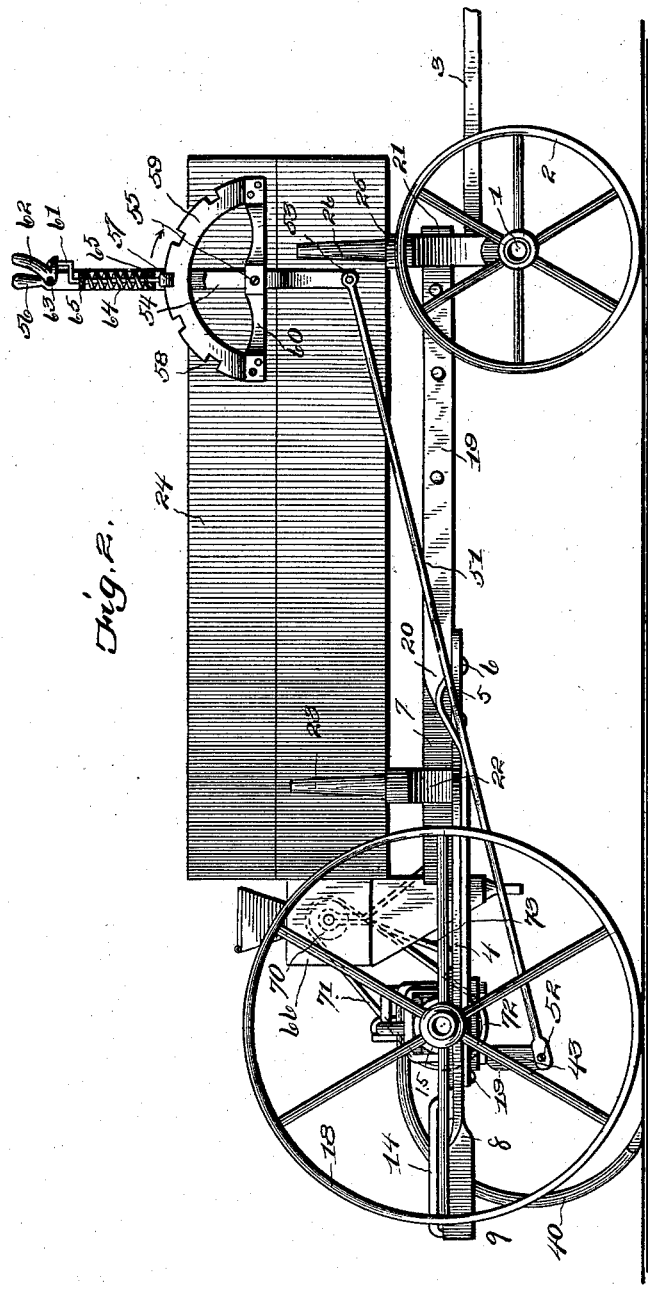
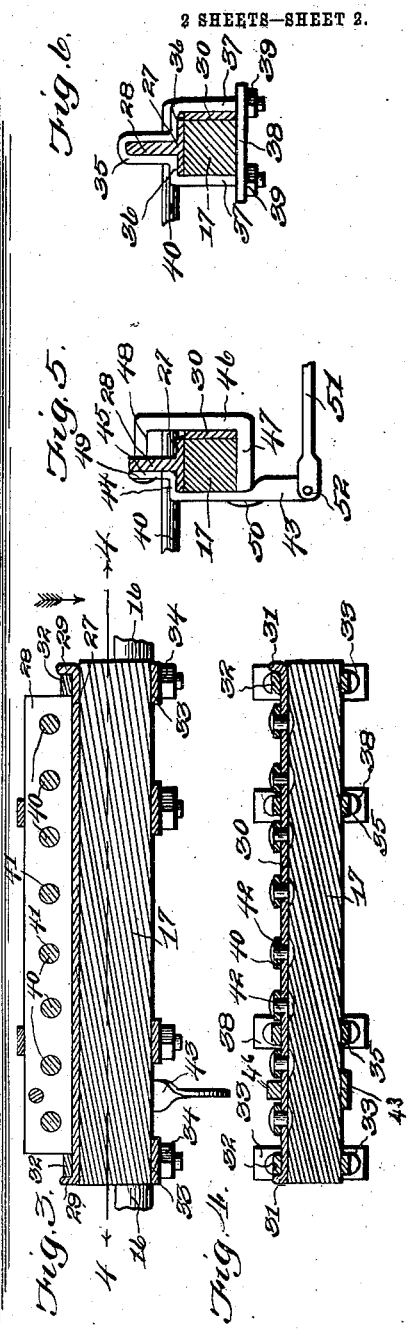
Witnesses
R. A. Boswell.
E. M. Brandt.
Inventor
Andy Rowan
By E. S. Bond
Attorney No. 741,979. Patented October 20, 1903.

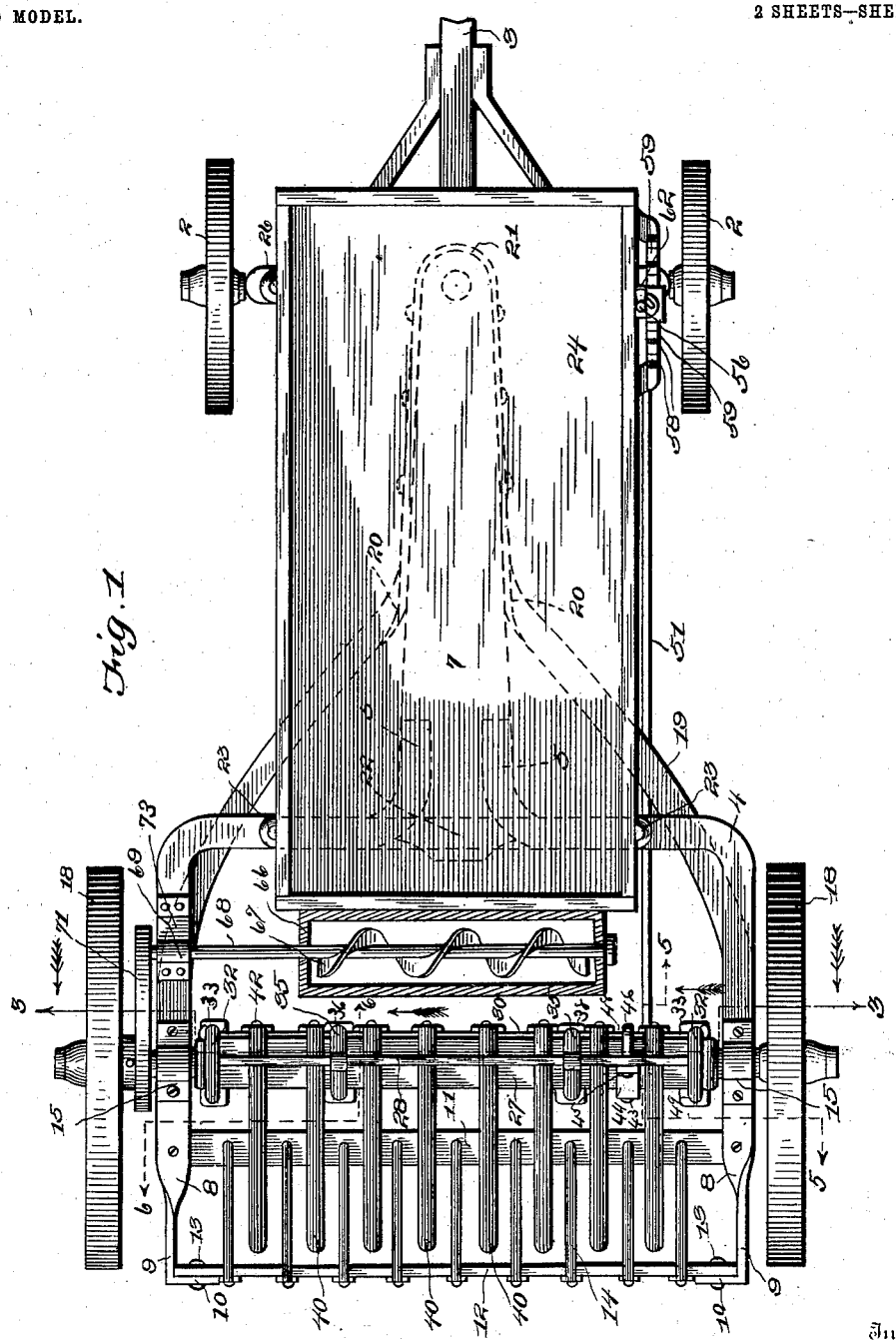

UNITED STATES PATENT OFFICE.

ANDY ROWAN, OF STEAMBOAT SPRINGS, COLORADO.

MACHINE FOR GRUBBING SAGE-BRUSH.

SPECIFICATION forming part of Letters Patent No. 741,979, dated October 20, 1903.

Application filed May 8, 1903. Serial No. 156,184. (No model.)

*To all whom it may concern:*

Be it known that I, ANDY ROWAN, a citizen of the United States of America, and a resident of Steamboat Springs, in the county of Routt and State of Colorado, have invented certain new and useful Improvements in Machines for Grubbing Sage-Brush, of which the following is a specification.

This invention relates to certain new and useful improvements in machines for grubbing sage-brush; and it has for its objects, among others, to provide a simple and cheap machine adapted for raking sage-brush or any other brush either before or after the ground is plowed and also one that is adapted to take the place of the harrow to cultivate the land. I also provide a seeder attachment operatively connected with the hind wheel, so as to be actuated by the rotation of such wheel.

A further object is to provide a strong and cheap and efficient rake in which the parts shall be so assembled and held in position as to prevent breakage, suitable means being provided for dumping the rake at predetermined intervals or whenever it may be desired.

I aim, further, at improvements in the details of construction whereby a strong and durable machine is provided and the cost of manufacture reduced.

Other objects and advantages of the invention will hereinafter appear, and the novel features thereof will be particularly pointed out in the appended claims.

The invention is clearly illustrated in the accompanying drawings, which, with the numerals of reference thereon, form a part of this specification, and in which—

Figure 1 is a plan view showing a machine constructed in accordance with my invention. Fig. 2 is a side elevation thereof. Fig. 3 is a vertical cross-section on the line 3 3 of Fig. 1. Fig. 4 is a section at right angles to Fig. 3, the section being taken on the line 4 4 of Fig. 3. Fig. 5 is a section on the line 5 5 of Fig. 1. Fig. 6 is a section on the line 6 6 of Fig. 1.

Like numerals of reference indicate like parts throughout the several views.

Referring now to the details of the drawings, 1 designates the forward axle, 2 the wheels, and 3 the tongue or bolt of a wagon, which parts may be of any well-known form of construction and the wheels of any approved type. As these parts form no part of this invention except to show the application thereof, a detailed description thereof is not given.

My improvement is applicable to any form of wagon, and it is intended to manufacture the same and place it upon the market ready to be thus applied.

The present improvement comprises a metallic frame 4, the same consisting, essentially, of two flat pieces of metal bent to form the side bars and the front cross-bar, the ends of said pieces of metal being extended forward and substantially parallel with each other, as seen at 5, and secured in any suitable manner, as at 6, to the under side of the short reach or coupling bar 7. The rear portion of these side bars is twisted, as at 8, to form the rearward extensions 9, which are disposed edgewise and the extreme ends bent inward at right angles to their length, as seen at 10 in Fig. 1. 11 is a cross-bar rigidly uniting the side bars near the bends or twists therein, as seen best in Fig. 1, and 12 is another cross-bar parallel with the bar 11 and secured to the portions 10 by suitable means, as bolts or rivets 13. (Seen also in Fig. 1.) 14 represents rods having their ends connected to the said bars 11 and 12, as shown, being disposed at right angles thereto or lengthwise of the machine and serving a function which will soon be explained. The side bars of this frame have secured thereto the clamps or bearings 15 for the spindles or axle-skeins 16, which are preferably integral with the rectangular axle 17, as seen best in Fig. 3. This axle is mounted for partial rotation in these bearings, and upon the spindles or skeins thereof are mounted to revolve the wheels 18, which may be of any well-known or approved form of construction.

19 is a metallic bar the rear ends of which extend under and are secured to the side bars of the frame 4, the said bar, which constitutes a brace-bar, being diagonally extended across the bends at the forward ends of the side bars, as seen in Fig. 1, and being twisted, as at 20, to bring the forward portions in a vertical plane, and the said vertical portion is bent around the forward end of the reach or coupling bar 7, as seen clearly at 21 in dotted lines in Fig. 1, suitable means being provided for securing the said bar to the reach, as seen in Figs. 1 and 2.

Secured to the front cross portions of the frame 4 is the bolster 22, from which rise the standards 23, between which is mounted the box 24, the forward end of which rests upon the front bolster 25 and between the standards 26, rising therefrom.

Secured to the upper face of the axle 17 is a plate 27, having rising centrally therefrom the vertical rib or portion 28, the ends of said bar being bent parallel to form flanges 29, as seen best in Fig. 3, while upon the front face of the axle is the plate 30, the ends of which are bent at right angles to form the flanges 31, as seen clearly in Fig. 4.

32 represents clamp-bars around the axle at the ends and bearing against the flanges 29 and 31 of the plates 27 and 30, as seen clearly in Figs. 3 and 4, so as to bind them rigidly in place. The lower ends of these clamps pass through openings in suitable plates 33 upon the under side of the axle and receive nuts 34, as seen clearly in Fig. 3.

35 represents clamp-plates having their upper portions bent to embrace the vertical web 28 of the plate 27 and having horizontal portions 36, which bear against the upper face of the horizontal portion of said plate, as seen clearly in Fig. 6, while the leg portions 37 embrace the rear face of the axle and the front face of the plate 30 and pass through openings in the plates 38, bearing against the under face of the axle, and receive the nuts 39, as seen clearly in Fig. 6. By these means I provide a very strong construction of axle and means for connecting the rake-teeth, whereby injury to the parts is prevented as the machine passes over the sage-brush.

40 represents the rake-teeth. They are made of sufficiently strong material to enable them to withstand the severe strain which they may be called upon to be subjected to, and they are fixed in position in the following manner: Each tooth has a shank passed through an opening 41 in the vertical portion or web 28 of the plate 27, and across the upper face of the horizontal portion of the plate 27 forward of said web or portion 28, and thence extended downward and bearing against the plate 30, being there secured by bolt or other suitable means 42, passed through the plate 30 and riveted upon the rear face thereof, as seen clearly in Fig. 4, whereby the teeth are held in a vertical as well as in a horizontal plane, making the connection most rigid and insuring against their displacement during the use of the machine. The shank of these teeth may be in a plane above the level of the plate portion 27, as seen in Fig. 3, or they may rest upon said plate, as seen in Figs. 5 and 6. The rake-teeth are disposed alternately with reference to the bars 14, as seen clearly in Fig. 1, so that each tooth is in a plane between two of said bars, which latter serve as clearers for the teeth, as is common in this class of devices.

43 is an arm depending from the rear side of the axle 17 and having an offset portion 44, bearing against the upper face of the horizontal portions of the plate 27, and a vertical portion 45, having a bearing against the rear face of the web 28 thereof, as seen clearly in Fig. 5.

46 is a securing device having a vertical portion bearing against the front face of the plate 30, a lower horizontal portion 47, bearing against the under face of the axle, and an upper portion 48, which extends through the web 28 and through the vertical portion 45 of the arm 43, where it is riveted or otherwise secured, as seen at 49 in Fig. 5. The other end of the member 46 passes through the arm 43, where it is riveted or otherwise affixed, as seen at 50 in said Fig. 5.

51 is a rod or bar having its lowermost and rear end connected, as at 52, to the lower portion of the arm 43 and its other end extended forward along the side of the box 24 and pivotally connected, as at 53, with the lower end of the lever 54, fulcrumed, as at 55, and having a handle portion 56 and a spring-actuated bolt 57, adapted to engage any one of the notches 58 in the segment 59, secured to the side of the box and in the lowermost horizontal connecting portion 60, on which the said lever is pivoted, all as seen most clearly in Fig. 2. This spring-actuated bolt is provided with a shank 61, which is connected with the pivoted handle or lever 62, pivoted at 63 on the lever 54, the spring 64, surrounding said shank, being confined between suitable stops or cross portions 65, as seen clearly in said Fig. 2.

Mounted upon the rear end of the box 24 is a seedbox 66, in which is the usual spiral 67, carried by the shaft 68, one end of which shaft is extended and has a bearing in a suitable boxing or the like 69, supported in a suitable brace 73, secured to one of the side bars of the frame 4, and upon this extended end of the shaft is a pulley or band wheel 70, around which passes a belt 71, which passes around a pulley 72, carried by the hub of the adjacent wheel 18, all as seen clearly in Figs. 1 and 2. These parts are so arranged that the spiral in the seedbox is actuated by the rotation of the wheel 18 during the movement of the machine over the ground.

The operation will be apparent from the foregoing description when taken in connection with the annexed drawings, and a further detailed description thereof does not seem necessary.

Modifications in detail may be resorted to without departing from the spirit of the invention or sacrificing any of its advantages.

What I claim as new is—

1. In a machine for grubbing sage-brush, a metallic frame having the rear portions of its side bars twisted and disposed vertically, a cross-bar connecting said side bars near their twists, and a rear cross-bar rigidly secured to the rear ends of said side bars, said side bars having their extreme rear ends bent inwardly and embracing the rear face of the rear cross-bar combined with an axle, a plate upon the upper face of said axle having a rib, and rake-teeth passed through openings in said rib.

2. In a machine for grubbing sage-brush, a metallic frame, an axle mounted therein and provided with rake-teeth, cross-bars to the rear of said axle connecting the side bars of said frame, and bars extending parallel with the rake-teeth and connecting the said cross-bars and alternating with the rake-teeth.

3. In a machine for grubbing sage-brush, a metallic frame, an axle mounted therein, a plate upon the axle having a vertical rib, means securing said plate to the axle, and rake-teeth also secured to the axle and extended through openings in said rib.

4. In a machine for grubbing sage-brush, a metallic frame, an axle mounted therein, plates upon the upper and front faces of said axle, means securing said plates to the axle, the upper plate having a vertical rib, and means embracing said rib and the axle, and rake-teeth passed through said rib.

5. In a machine for grubbing sage-brush, a metallic frame, an axle mounted therein, plates upon the upper and front faces of said axle, means securing said plates to the axle, the upper plate having a vertical rib, and means embracing said rib and the axle, and rake-teeth passed through said rib, said plates having flanged ends.

6. In a machine for grubbing sage-brush, a metallic frame, an axle mounted therein, plates upon the upper and front faces of said axle, means securing said plates to the axle, the upper plate having a vertical rib, and means embracing said rib and the axle, and rake-teeth passed through said rib, said plates having flanged ends, the shanks of said rake-teeth being bent and extended vertically and secured to the front plate on the axle.

7. In a machine for grubbing sage-brush, a metallic frame, an axle mounted therein, a plate upon the top of said axle having a vertical rib, a plate on the front face of said axle, and means embracing said plates and rib, and securing the same in position.

8. In a machine for grubbing sage-brush, a metallic frame, an axle mounted therein, a plate on the front face of said axle, a plate on the upper side of said axle having a vertical rib, an arm bearing against the rear face of the axle with its lower end depending below the same and its upper end bent to embrace the upper face of the upper plate and the rear face of said rib, and means passed through the upper end of said arm and the rib and bearing against the front and lower sides of the axle and passed through said arm.

Signed by me at Steamboat Springs, Colorado, this 2d day of May, 1903.

ANDY ROWAN.

Witnesses:
R. M. VAN DEUSEN,
W. E. MYLER.